United States Patent
Mani et al.

(10) Patent No.: US 12,002,336 B2
(45) Date of Patent: Jun. 4, 2024

(54) METHODS AND SYSTEMS FOR DETECTING AND TRACKING OBJECTS

(71) Applicant: DIGIT7 INDIA PRIVATE LIMITED, Richardson, TX (US)

(72) Inventors: Chithrai Selvakumar Mani, Richardson, TX (US); Venkat Shiva Pandiri, Irving, TX (US)

(73) Assignee: DIGIT7 INDIA PRIVATE LIMITED, Richardson, TX (US)

( * ) Notice: Subject to any disclaimer, the term of this patent is extended or adjusted under 35 U.S.C. 154(b) by 359 days.

(21) Appl. No.: 17/303,937

(22) Filed: Jun. 10, 2021

(65) Prior Publication Data

US 2022/0398903 A1    Dec. 15, 2022

(51) Int. Cl.
| | | |
|---|---|---|
| G07G 1/00 | (2006.01) | |
| A47F 9/04 | (2006.01) | |
| G06K 17/00 | (2006.01) | |
| G06Q 20/20 | (2012.01) | |

(52) U.S. Cl.
CPC ........... *G07G 1/0036* (2013.01); *A47F 9/048* (2013.01); *G06K 17/00* (2013.01); *G06Q 20/20* (2013.01)

(58) Field of Classification Search
None
See application file for complete search history.

(56) References Cited

U.S. PATENT DOCUMENTS

| | | |
|---|---|---|
| 2008/0219509 A1 | 9/2008 | White et al. |
| 2020/0020113 A1* | 1/2020 | Buibas ............... G07G 1/0036 |
| 2020/0184230 A1* | 6/2020 | Liu ......................... G06T 7/70 |
| 2021/0004589 A1* | 1/2021 | Turkelson ............. G06V 10/82 |
| 2021/0124944 A1* | 4/2021 | Datar ............... G08B 13/19645 |

OTHER PUBLICATIONS

Form PCT/ISA/210.
Form PCT/ISA/220.
Form PCT/ISA/237.
Iguernaissi Rabah, Merad Djamel, Drap Pierre; People tracking in multi-camera systems: a review; ResearchGate; Multimedia Tools and Applications; Apr. 2019.
Jiang Xiaoyan, Rodner Erick, Denzler Joachim; Multi-Person Tracking-by-Detection based on Calibrated Multi-Camera Systems; University of Jena; Computer Vision Group Jena; Oct. 25, 2012.

(Continued)

*Primary Examiner* — Delomia L Gilliard
(74) *Attorney, Agent, or Firm* — Steven H. Washam; Washam IP

(57) ABSTRACT

The embodiments herein relate to surveillance of objects and, more particularly, to efficient detection and tracking of objects. A method disclosed herein includes detecting at least one object in the physical store, on receiving media from a plurality of media acquisition devices positioned in the physical store. The method further includes tracking the at least one object in the physical store by projecting input data points of each media acquisition device onto a groundplot, clustering the input data points into a single cluster, and assigning a tracking identifier (ID) to a centroid of the single cluster, wherein the centroid depicts the at least one object.

12 Claims, 16 Drawing Sheets

(56) References Cited

OTHER PUBLICATIONS

Liem Martijn, Gavrila Dariu; Multi-person tracking with overlapping cameras in complex, dynamic environments; BMVC; 2009.
Liu Wenqian, Camps Octavia, Sznaier Mario; Multi-camera Multi-object Tracking; arXiv:1709.07065v1; Sep. 20, 2017.
Narayan Neeti, Sankaran Nishant, Arpit Devansh, Dantu Karthik, Setlur Srirangaraj, Govindaraju Venu; Person Re-identification for Improved Multi-person Multi-camera Tracking by Continuous Entity Association; University at Buffalo, Suny; CVPR Workshop; IEEE Conference; 2017.
Niu Wei, Jiao Long, Han Dan, Wang Yuan-Fang; Real-Time Multi-person Tracking in Video Surveillance; UC Santa Barbara; Department of Computer Science; Aug. 31, 2003.
Ristani Ergys, Tomasi Carlo; Features for Multi-Target Multi-Camera Tracking and Re-Identification; Duke University; Apr. 11, 2018.
Sankaranarayanan Aswin, Veeraraghavan Ashok, Chellappa Rama; Object Detection, Tracking and Recognition for Multiple Smart Cameras; Proceedings of IEEE; vol. 96 No 10; Oct. 2008.

* cited by examiner

METHODS AND SYSTEMS FOR DETECTING AND TRACKING OBJECTS

TECHNICAL FIELD

The embodiments herein relate to managing objects in a physical store and, more particularly, to detection and tracking of objects in a physical store.

BACKGROUND

A smart retail store, like a physical store, employs a cashierless checkout method that automates the journey of customers within the retail store. Instead of a usual checkout line that involves cashiers, the cashierless checkout method enables a retailer to detect and track the customers, checkout products intuitively as the customers pick out the products, and auto-generate a bill for the customers.

In conventional approaches, the cashierless checkout method involves performing groundplot tracking to detect and track the customer and associated movements in the retail store. The groundplot tracking includes detecting each of the customers in the retail store using one or more depth cameras or a Light Detection and Ranging (LIDAR) system, wherein the one or more depth cameras or the LIDAR may be attached to a ceiling (for example: at least 30 feet height) by covering an entire area of the retail store. However, such a process of detecting the customers requires excessive Graphical Processing Unit (GPU) resources on multiple servers.

On detecting the customer, the groundplot tracking involves assigning a tracking identifier (ID) to each of the customers detected based on the one or more depth cameras or the LIDAR system. However, the tracking ID of the customer may not be transferred from one depth camera to another. Thus, if the depth camera has stopped operating or malfunctioned, then the tracking ID of the customer may be lost. In addition, a loss of the tracking ID of the customer may result in at least one of, inappropriate billing to the customer, loss of revenue, low customer satisfaction, and so on.

BRIEF DESCRIPTION OF THE FIGURES

The embodiments disclosed herein will be better understood from the following detailed description with reference to the drawings, in which.

DETAILED DESCRIPTION OF EMBODIMENTS

Figure 1A:
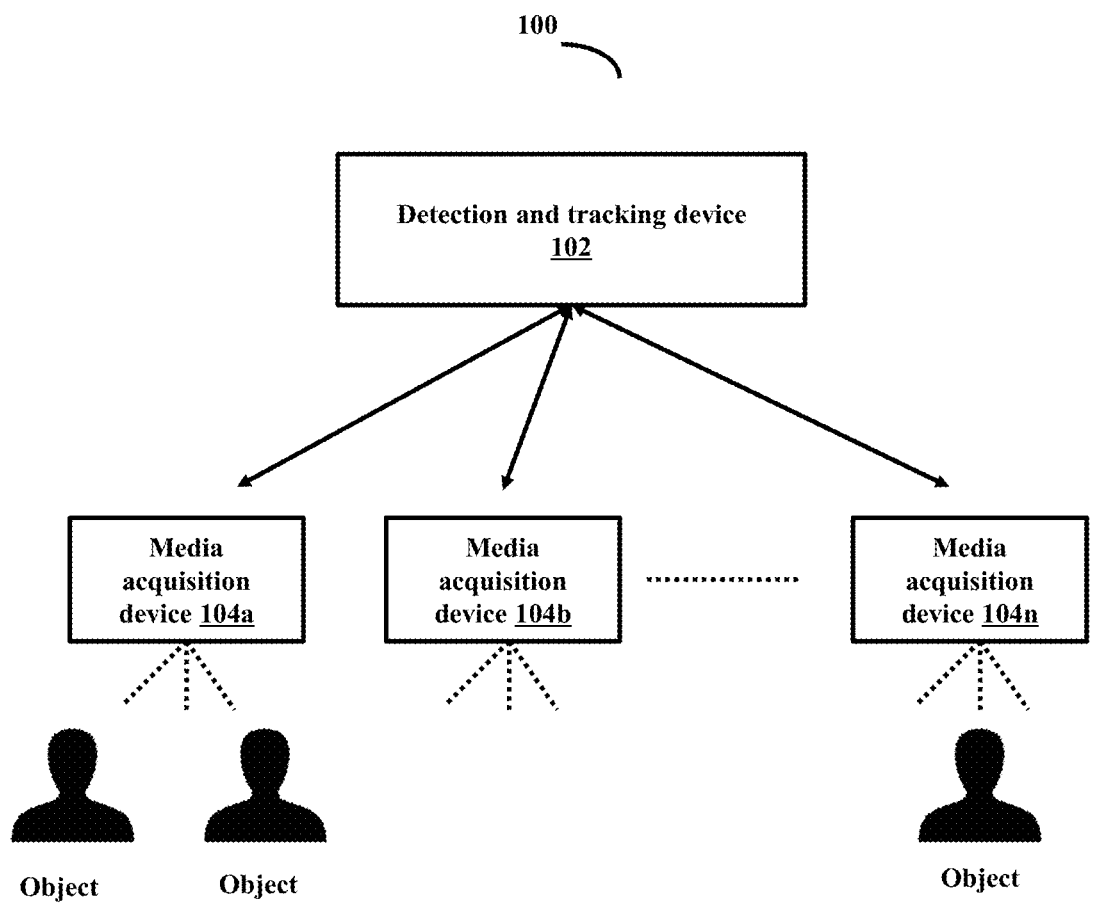
FIGS. 1a, 1b, and 1c depict a tracking system, according to embodiments as disclosed herein, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for detecting and tracking objects within a physical store.

Referring now to the drawings, and more particularly to FIGS. 1 through 14, where similar reference characters denote corresponding features consistently throughout the figures, there are shown embodiments.

Figure 1B:
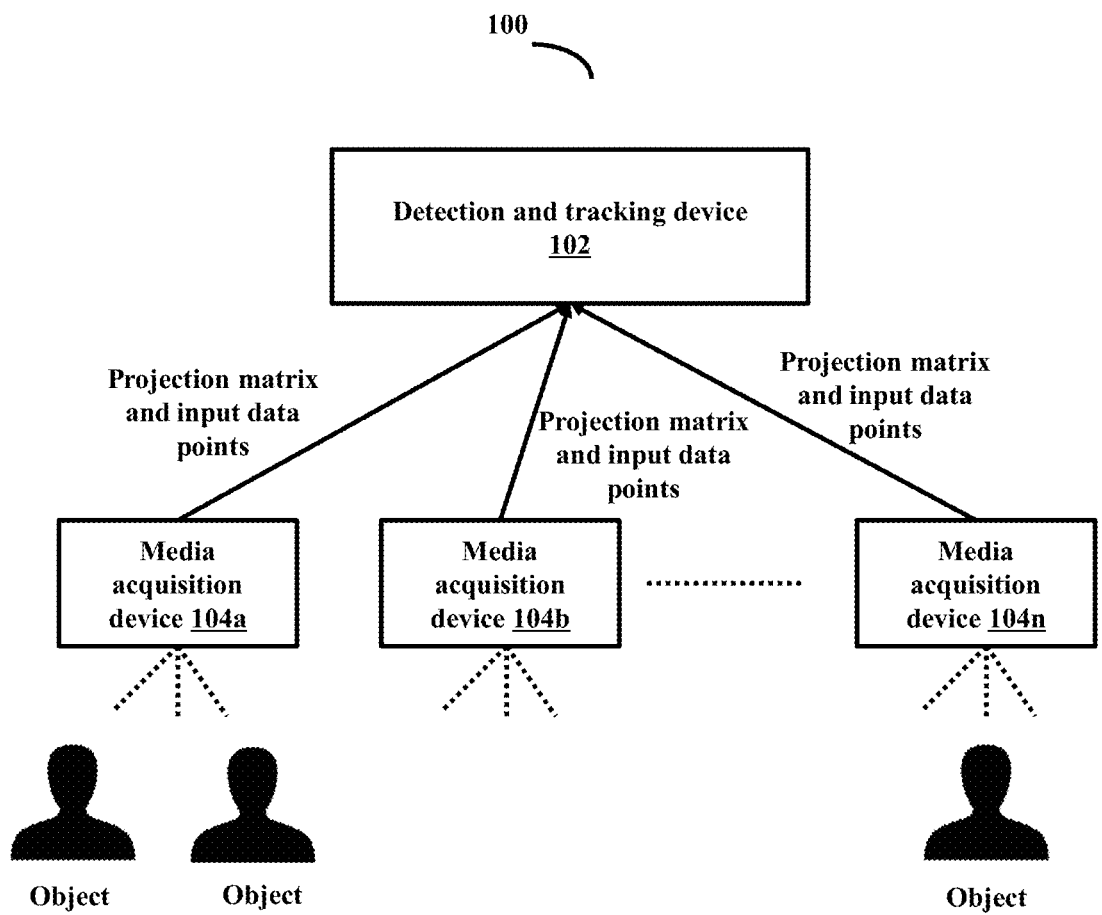
Figure 1C:
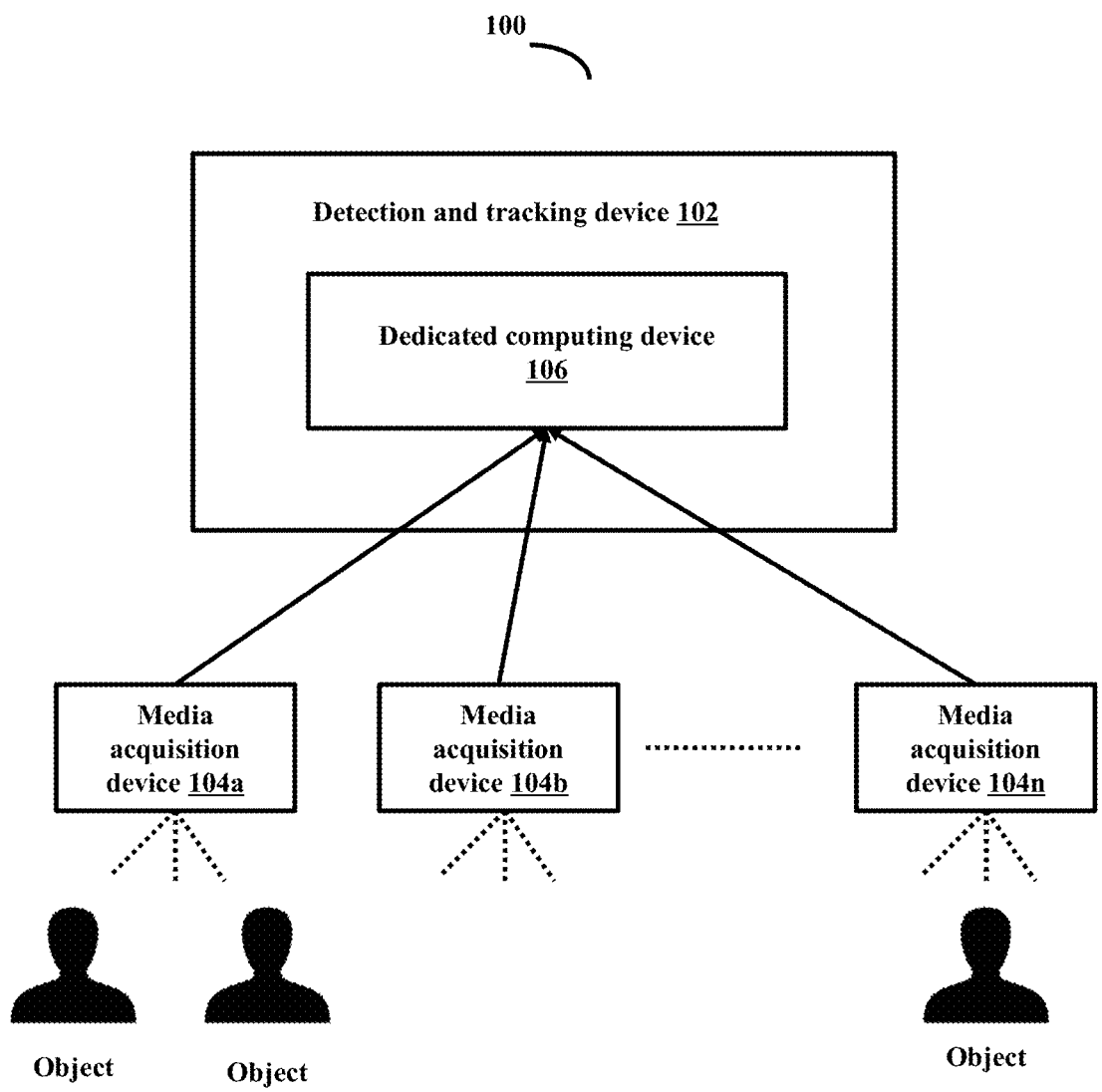

FIGS. 1a, 1b, and 1c depict a tracking system 100, according to embodiments as disclosed herein. The tracking system 100 referred herein may be configured to detect and track objects in a physical store. In an example, the objects may be detected and tracked for at least one of, but is not limited to, a cashier less check out, an automated authentication of objects, and so on.

The physical store may be a physical space or environment, which includes a movement of the objects. In an example, the physical store may include at least one of, but is not limited to, a retail store, a grocery store, a convenience store, a warehouse, a storage center, or any other store, wherein customers may buy any products/items. In another example, the physical store may include at least one of, but is not limited to, an airport, an office building, a factory unit, a medical center, a restaurant, an amusement park, or any other space, wherein the objects have to be detected and tracked. It is understood that the physical store may include any other various spaces where the objects have to be detected and tracked (including those described above).

Examples of the objects referred herein may be, but are not limited to, customers, employees, patients, staff, children, and so on.

As depicted in FIG. 1a, the tracking system 100 includes a detection and tracking device 102, and media acquisition devices 104a-104n. The detection and tracking device 102 and the media acquisition devices 104a-104n may be connected with each other. In an example, the detection and tracking device 102 and the media acquisition devices 104a-104n may be connected with each other using a communication network (not shown). The communication network may include at least one of, but is not limited to, a wired network, a value-added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC), and so on. In another example, the media acquisition devices 104a-104n may be connected with each other directly (for example: via a direct communication, via an access point, and so on) or through the communication network. In another example, the detection and tracking device 102 and the media acquisition devices 104a-104n may be connected with each other via a relay, a hub, and a gateway. It is understood that the detection and tracking device 102 and the media acquisition devices 104a-104n may be connected to each other in any of various manners (including those described above) and may be connected to each other in two or more of various manners (including those described above) at the same time.

The detection and tracking device 102 referred herein may include at least one of, but is not limited to, a cloud computing device (can be a part of a public cloud or a private cloud), a server, a database, an electronic device, and so on. The server may be at least one of a standalone server, a server on a cloud, or the like. The electronic device may be, but are not limited to, a personal computer, a notebook, a tablet, desktop computer, a laptop, a handheld device, a mobile device, and so on. Also, the detection and tracking device 102 may be at least one of, a microcontroller, a processor, a System on Chip (SoC), an integrated chip (IC), a microprocessor based programmable consumer electronic device, and so on. In an example, the detection and tracking device 102 may be positioned on premises of the physical store. In another example, the detection and tracking device 102 may be remotely located from the physical store.

The detection and tracking device 102 may be configured to control positions and working of the media acquisition devices 104a-104n. The detection and tracking device 102 divides an entire area of the physical store into a plurality of points and allows an owner of the physical store to deploy the media acquisition devices 104a-104n in the physical store based on the divided area. The plurality of points may be fixed points. Each media acquisition device (104a-104n) may have at least three points in its field of view/coverage. The detection and tracking device 102 selects at least three points for each media acquisition device (104a-104n) randomly. The selected at least three points for the media acquisition device (104a) may or may not overlap with the at least three points of the other media acquisition device (104b-104n). Examples of the media acquisition devices 104a-104n may be, but are not limited to, a camera, an imaging sensor, a digital camera, a thermal camera, a depth camera, a RGB camera, a Light Detection and Ranging (LIDAR), and so on.

The detection and tracking device 102 allows the owner of the physical store to deploy the media acquisition devices 104a-104n in the physical store in such a way that at least one media acquisition device has to cover the certain area of the physical store by having the at least three points in its field of view. Thus, a combination of the media acquisition devices 104a-104n covers an entire area of the physical store and also if the object is not detected from one media acquisition device 104a, at least one other media acquisition device 104b-104n may detect the object. Thus, tracking of the object in the physical store may not be lost.

In an example, the media acquisition devices 104a-104n may be positioned in the physical store by hinging the media acquisition devices 104a-104n to a ceiling of the physical store in order to cover the at least three points of the physical store. The media acquisition devices 104a-104n may be positioned on the ceiling of the physical store to avoid occlusions. In another example, the media acquisition devices 104a-104n may be positioned on walls of the physical store to cover the at least three points of the physical store. The media acquisition devices 104a-104n may be positioned at any suitable angles on the ceiling or the walls to cover the at least three points of the physical store. The media acquisition devices 104a-104n may be positioned next to each other with a little overlap between the adjacent media acquisition devices 104a-104n. For the ease of description and better understanding of the embodiments, positioning the media acquisition devices on the ceilings, and walls may be considered as example methods, but it may be obvious to a person skilled in the art the media acquisition devices may be deployed in any other manner (including those described above) in the physical store.

The media acquisition devices 104a-104n may be configured to capture media of the least one point of the physical store and detect the at least one object in the captured media. Examples of the media may be, but are not limited to, an image, video, and so on. The detection and tracking device 102 trains the media acquisition devices 104a-104n to detect the at least one object in the captured media using custom training methods such as, but are not limited to, a YOLO v4 training method, a computer vision (CV) method, and so on. For training the media acquisition devices 104a-104n, the detection and tracking device 102 captures media (images, videos, or the like) of multiple objects as training dataset and generates annotations for the multiple objects. The annotations include information about annotated heads of the multiple objects. The detection and tracking device 102 uses the custom training method to train the media acquisition devices 104a-104n based on the annotations. Each trained media acquisition device (104a-104n) detects the at least one head from the captured media and tags the detected at least one head as the at least one object. Each media acquisition device (104a-104n) provides the media including the detected at least one object to the detection and tracking device 102. In an example, the media may be an image frame including the detected at least one object.

Alternatively, the media acquisition devices 104a-104n provide the captured media to the detection and tracking device 102. The detection and tracking device 102 detects the at least one object in the captured media like the media acquisition devices 104a-104n, thus a repeated description thereof is omitted for conciseness.

On detecting the one or more objects in each media, the detection and tracking device 102 tracks the detected at least one object by assigning a tracking identifier (ID) for the at least one object. For tracking each object, the detection and tracking device 102 derives and projects input data points corresponding to each media acquisition device (104a-104n) onto a groundplot, clusters the input data points corresponding to each media acquisition device (104a-104n) into a single cluster and assigns the tracking ID to a centroid of the cluster, wherein the single centroid depicts the object.

For deriving the input data points from each media acquisition device (104a-104n), the detection and tracking device 102 identifies a first bounding box and a second bounding box wherein the at least one object is detected, from the media received from the media acquisition device (104a-104n). The media may be the frame enclosing the object. The bounding box may be a box with a smallest measure, which include pixel coordinates of the at least one object. In an example, the first bounding box and the second bounding box may be a top left box and a bottom right box, respectively, of the media/frame that includes the at least one object. The detection and tracking device 102 creates an average bounding box based on an average of coordinates of the first bounding box and the second bounding box. The detection and tracking device 102 derives the pixel coordinates of the average bounding box as the input data points of the at least one object corresponding to the media acquisition device (104a-104n). Thus, the input data points derived corresponding to each media acquisition device (104a-104n) depict the pixel coordinates of the at least one object detected by the corresponding media acquisition device (104a-104n).

Consider an example scenario, wherein the detection and tracking device 102 receives the media/image frame from a depth camera (an example of the media acquisition device) of resolution 1980×1080. The image frame includes the object detected with the first bounding box of 200×400 (top left of the image frame) and the second bounding box of 400×600. In such a scenario, the detection and tracking device 102 generates the average bounding box of 300×500 based on the average of the first bounding box and the second bounding box. The detection and tracking device 102 determines the pixel coordinates of the average bounding box as the input data points of the depth camera.

On deriving the input data points of each media acquisition device (104a-104n), the detection and tracking device 102 projects the input data points of each acquisition device (104a-104n) onto the groundplot. The groundplot may be a hyperplane.

The detection and tracking device 102 projects the input data points of each media acquisition device (104a-104n) onto the groundplot using a calibration process and matrix multiplication. The calibration process may be a process of finding and correcting significant distortion of the at least one object detected from the received media of each media acquisition device (104a-104n) to an actual view. The actual view depicts how the at least one object should has to be look like on the groundplot. Before performing the calibration process, the detection and tracking device 102 ensures that at least one of the media acquisition devices 104a-104n covers the at least three points of the physical store (that is, each point is not required to be covered by all the media acquisition devices 104a-104n). The detection and tracking device 102 performs the calibration process on ensuring that the at least three points of the physical store have been covered by each of the media acquisition devices (104a-104n).

For performing the calibration process, the detection and tracking device 102 initially obtains the media of a first point of the plurality of points from the respectively covered media acquisition device (104a-104n) for a defined time period. In an example, the detection and tracking device 102 defines the time period based on a number of input data points of the media acquisition device (104a-104n) required at each point of the plurality of points for finding and correcting the distortion of the at least one object. Consider an example scenario, wherein the detection and tracking device 102 requires 200 input data points from each of the plurality of points for accurately finding and correcting the distortion of the object. In such a scenario, the detection and tracking device 102 defines the time period as 10 seconds, as 20 data points may be captured per second. The first point may be the point in the physical store, wherein the at least one object has been detected.

On obtaining the media of the first point from the respectively covered media acquisition device (104a), the detection and tracking device 102 detects the input data points from the media of the corresponding media acquisition device (104a) obtained at the first point. The input data points of the media acquisition device (104a) detected at the first point may depict the at least one object detected at the first point of the physical store. The detection and tracking device 102 maps the input data points of the media acquisition device (104a) detected at the first point onto the groundplot. Data points on the groundplot corresponding to the input data points of the media acquisition device (104a-104n) may be hereinafter referred as target data points of the respective media acquisition device (104a-104n).

On mapping the input data points of the media acquisition device (104a) detected at the first point onto the groundplot, the detection and tracking device 102 obtains the media from the other media acquisition devices (104b-104n), which have been captured at their respective coverage points of the physical store. The detection and tracking device 102 detects the input data points from the media of each of the media acquisition devices (104b-104n) obtained at the respective coverage points of the physical store. The input data points of the media acquisition devices (104b-104n) detected at the respective coverage points may or may not depict the at least one object detected at the first point. The detection and tracking device 102 maps the input data points of each of the media acquisition device (104b-104n) detected at the respective coverage points of the physical store onto the groundplot. Thus, the detection and tracking device 102 maps the input data points of all the media acquisition devices 104a-104n detected at the different points of the physical store onto the groundplot.

The detection and tracking device 102 creates a projection matrix for each media acquisition device (104a-104n). The projection matrix created for each media acquisition device (104a-104n) acts a bridge between the input data points of the media acquisition device (104a-104n) detected at the particular points of the physical store and the target data points of the respective media acquisition device (104a-104n) mapped on the groundplot. The detection and tracking device 102 creates the projection matrix for each media acquisition device as:

$$\text{Projection matrix} = (O \cdot IT) \cdot INV(I \cdot IT)$$

wherein 'I' is an input matrix depicting the input data points of the corresponding media acquisition device detected at the particular point, 'O' is an output matrix depicting the target data points of the respective media acquisition device mapped onto the groundplot, and 'IT' is a transpose of the input matrix.

Consider an example scenario, wherein the input data points of the media acquisition device 104*a* are (523.45, 438.22), and (511.79, 224.11) and the target data points of the media acquisition device 104*a* are (9, 1.5) and (10.5, 1.5). In such a scenario, the detection and tracking device 102 constructs the input matrix depicting the input data points of the media acquisition device 104*a* as:

$$\text{Input matrix } I = \begin{bmatrix} 523.45 & 438.22 \\ 511.79 & 224.11 \end{bmatrix}$$

The detection and tracking device 102 constructs the output matrix depicting the target data points of the media acquisition device 104*a* as:

$$\text{Output matrix } O = \begin{bmatrix} 9 & 10.5 \\ 1.5 & 1.5 \end{bmatrix}$$

The detection and tracking device 102 constructs the transpose matrix of the input matrix as:

$$\text{Transpose matrix } IT = \begin{bmatrix} 523.45 & 511.79 \\ 438.22 & 224.11 \end{bmatrix}$$

The detection and tracking device 102 determines the projection matrix for the media acquisition device 104*a* as:

$$\text{Projection matrix} = \left( \begin{bmatrix} 9 & 10.5 \\ 1.5 & 1.5 \end{bmatrix} \cdot \begin{bmatrix} 523.45 & 511.79 \\ 438.22 & 224.11 \end{bmatrix} \right) \cdot$$

$$INV\left( \begin{bmatrix} 523.45 & 438.22 \\ 511.79 & 224.11 \end{bmatrix} \cdot \begin{bmatrix} 523.45 & 511.79 \\ 438.22 & 224.11 \end{bmatrix} \right)$$

$$\text{Projection matrix} = \begin{bmatrix} 0.031381912450853 & -0.014511541984796 \\ 0.0040341702484333 & -0.0011951902470591 \end{bmatrix}$$

Similarly, the detection and tracking device 102 determines the projection matrix for all the media acquisition devices 104*b*-104*n*.

On creating the projection matrix for each of the media acquisition devices 104*a*-104*n* after calibration, the detection and tracking device 102 determines output data points for each media acquisition device (104*a*-104*n*) by performing the matrix multiplication. The matrix multiplication performed for each media acquisition device (104*a*-104*n*) includes multiplication of the projection matrix with the input matrix including the input data points of the respective media acquisition device (104*a*-104*n*). The detection and tracking device 102 determines the output data points for each media acquisition device (104*a*-104*n*) as:

output data points=(projection matrix)×(input matrix)

Consider an example scenario, wherein the projection matrix determined for the media acquisition device 104*a* and the input matrix depicting the input data points of the media acquisition device 104*a* are:

$$\text{Projection matrix} = \begin{bmatrix} 0.031381912450853 & -0.014511541984796 \\ 0.0040341702484333 & -0.0011951902470591 \end{bmatrix}$$

$$\text{Input matrix} = \begin{bmatrix} 515.28 \\ 433.56 \end{bmatrix}$$

In such a scenario, the detection and tracking device 102 determines the output data points for the media acquisition device 104*a* as:

Output data points =

$$\left( \begin{bmatrix} 0.031381912450853 & -0.014511541984796 \\ 0.0040341702484333 & -0.0011951902470591 \end{bmatrix} \right) \times \begin{bmatrix} 515.28 \\ 433.56 \end{bmatrix}$$

$$\text{Output data points} = \begin{bmatrix} 9.878847704747379 \\ 1.5605405620977675 \end{bmatrix}$$

Figure 8:
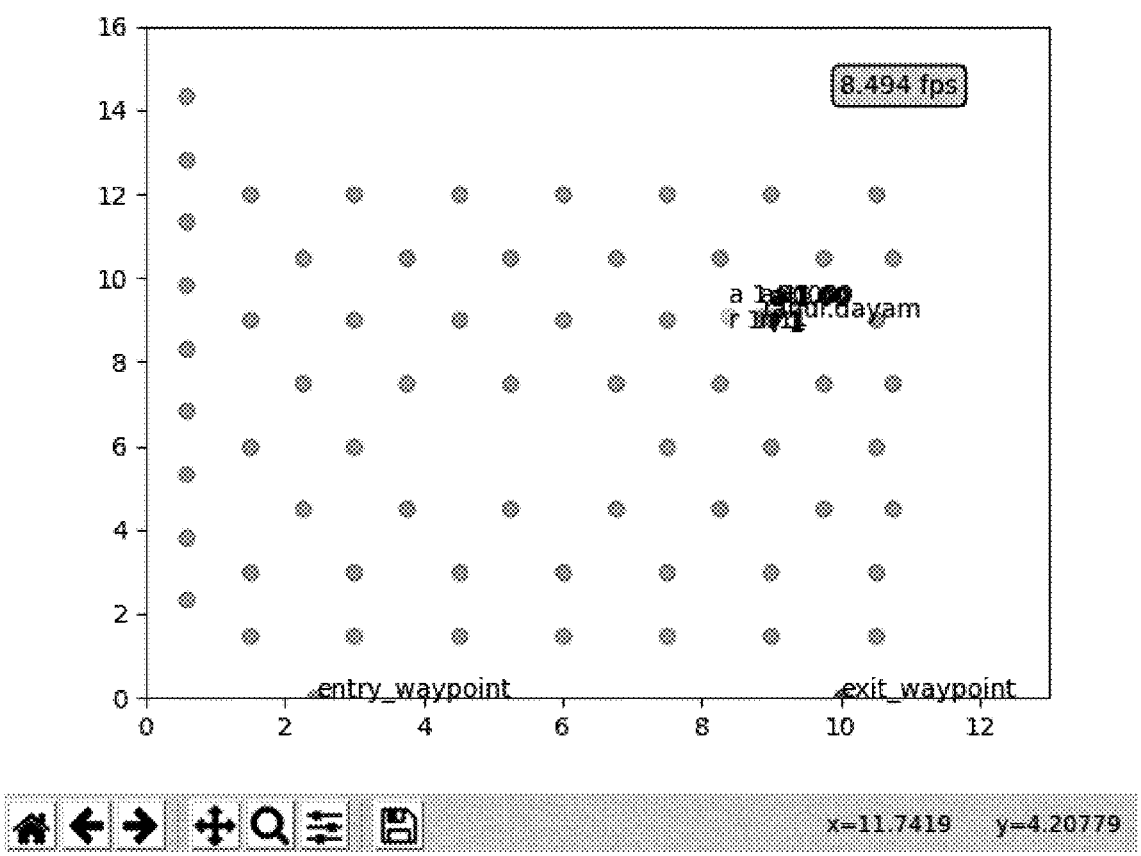
FIG. 8 depicts a groundplot visualization, according to embodiments as disclosed herein.

The output data points (9.878847704747379, 1.5605405620977675) may be projection of the input data points acquired by the media acquisition device 104*a*. The output data points may one of the projections of the object detected in the physical store like the data points of the groundplot visualization (as depicted in FIG. 8).

The detection and tracking device 102 visualizes the output data points of each media acquisition device (104*a*-104*n*) on the groundplot. The visualization of the output data points of each media acquisition device (104*a*-104*n*) on the groundplot may depict data points of the same object strongly associated/connected to each other on the groundplot.

On visualizing the output data points of each media acquisition device (104*a*-104*n*) on the groundplot, the detection and tracking device 102 performs a clustering to assign the tracking ID for each object. For assigning the tracking ID to each object, the detection and tracking device 102 forms the cluster by grouping the data points of the same object on the groundplot that have been strongly associated with each other. The detection and tracking device 102 forms the cluster using a k-means clustering method of a neural network. Examples of the neural network may be, but are not limited to, a machine learning network, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a deep Q-networks, an Artificial Intelligence (AI) model, a regression based neural network, and so on. The neural network includes a plurality of nodes, which may be arranged in layers. Examples of the layers may be, but are not limited to, a convolutional layer, an activation layer, an average pool layer, a max pool layer, a concatenated layer, a dropout layer, a fully connected layer, a SoftMax layer, and so on. A topology of the layers of the neural network may vary based on the type of the correlation module. In an example, the correlation module may include an input layer, an output layer, and a hidden layer. The input layer receives an input (for example: the points of the object having the strong connection associated with each other) and forwards the received input to the hidden layer. The hidden layer transforms the input received from the input layer into a representation, which can be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers. The input layer, the hidden layer, and the output layer may perform the respective functions based on the K-clustering method.

On forming the cluster, the detection and tracking device 102 identifies a centroid of the cluster. The centroid of the cluster may be the single point depicting the object. The detection and tracking device 102 assigns the tracking ID to the centroid/object. The detection and tracking device 102 assigns the tracking ID to the object, when the data points of the object on the groundplot appear near the vicinity of an entry point of the physical store.

On assigning the tracking ID to each object, the detection and tracking device 102 may track the movements of each object in the physical store by transferring the tracking ID from one media acquisition device to another, for further processing. In an example, if the object is a customer and the physical store is a retail store, the detection and tracking device 102 may track the customer, determine the products picked up the customer and auto-generate a bill for the customer, based on the tracking ID of the customer and the media of the customer received from the media acquisition devices 104a-104n.

The detection and tracking device 102 may display the detected objects and the associated tracking ID to an authorized person/owner of the physical store, if the detection and tracking device 102 is positioned on premises of the physical store. Alternatively, the detection and tracking device 102 may provide information about the detected objects and the associated tracking ID to a device used by the authorized person/owner of the physical store through the communication network.

In an embodiment, as depicted in FIG. 1B, each of the media acquisition device (104a-104n) may be configured to perform at least one intended action of the detection and tracking device 102. The at least one action may include capturing the media of its associated point, determining the one or more objects from the media, and projecting the input data points of each object onto the groundplot by creating the projection matrix. The media acquisition device (104a-104n) may be configured to perform the at least one action, like the detection and tracking device 102, and thus a repeated description thereof is omitted for conciseness. The media acquisition device (104a-104n) communicates the created projection matrix to the detection and tracking device 104. The detection and tracking device 102 may receive the projection matrix of each media acquisition device (104a-104n) and the associated input data points. The detection and tracking device 102 determines the output data points for each media acquisition device (104a-104n) by performing the matrix multiplication of the projection matrix with the respective input data points. The detection and tracking device 102 visualizes/projects the continuous stream of the output data points of each media acquisition device (104a-104n) on the groundplot. The detection and tracking device 102 clusters the data points of the same object and assigns the tacking ID to the object.

As depicted in FIG. 1c, the detection and tracking device 102 can be a dedicated computing device 106. The dedicated computing device 106 may be positioned on-premises of the physical store to detect and track the objects in the physical store. In an example, the dedicated computing device 106 may be a cost effective and power-efficient embedded AI computing device. The dedicated computing device 106 may include at least one of, processors, a memory, storage, Input/Output (I/O) ports, and so on to detect and track the objects in the physical store. The one or more processors of the dedicated computing device 106 may be a general-purpose processor, such as a central processing unit (CPU), an application processor (AP), or the like, a visual processing unit (VPU), and/or an AI-dedicated processor such as a neural processing unit (NPU), or the like.

The dedicated computing device 106 may detect and track the objects within the physical store like the detection and tracking device 102, and thus a repeated description thereof is omitted for conciseness. The dedicated computing device 106 may detect and track the objects within the physical store with reduced cost and power consumption. The dedicated computing may detect and track the objects within the physical store by eliminating unnecessary hardware components such as, but are not limited to, Universal Serial Bus (USB) cables and extensions, or the like.

FIGS. 1a, 1b, and 1c show exemplary blocks of the tracking system 100, but it is to be understood that other embodiments are not limited thereon. In other embodiments, the tracking system 100 may include less or more number of blocks. Further, the labels or names of the blocks are used only for illustrative purpose and does not limit the scope of the embodiments herein. One or more blocks can be combined together to perform same or substantially similar function in the tracking system 100.

Figure 2:
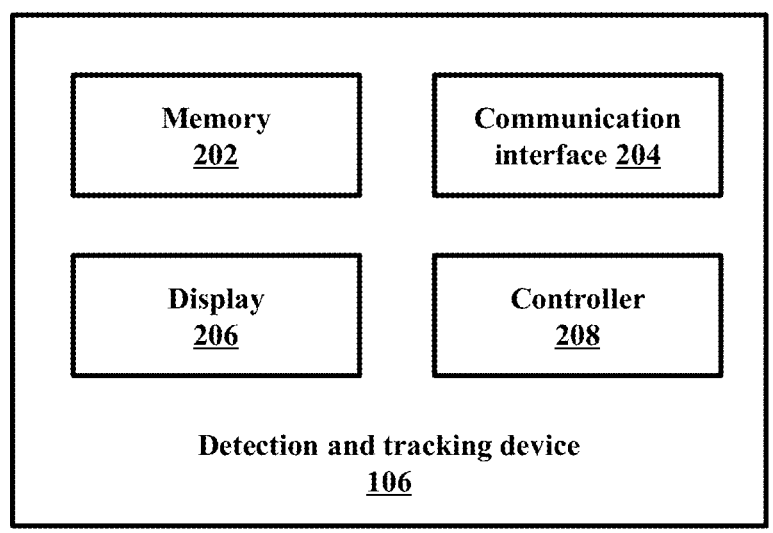
FIG. 2 is an example block diagram depicting components of a detection and tracking device for detecting and tracking objects within a physical store, according to embodiments as disclosed herein.

FIG. 2 is an example block diagram depicting components of the detection and tracking device 102 for detecting and tracking the objects within the physical store, according to embodiments as disclosed herein. The detection and tracking device 102 includes a memory 202, a communication interface 204, a display 206, and a controller 208. The detection and tracking device 102 may also include Input/Output (I/O) ports, communication ports, signal processing circuitries, and so on (not shown).

The memory 202 may store at least one of, information about the media acquisition devices 104a-104n deployed in the physical store, the detected objects, the tracking ID of the objects, and so on. The memory 202 may also store an object detection and tracker 300, which may be executed by the controller 208 for detecting and tracking the objects present within the physical store. Examples of the memory 202 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 202 may include one or more computer-readable storage media. The memory 202 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 202 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The communication interface 204 may be configured to enable the detection and tracking device 102 to communicate with at least one of, the media acquisition devices 104a-104n, the device used by the authorized person of the physical store, and so on, using communication methods supported by the communication network. The communication methods may include at least one of, but is not limited to, a wired communication, a wireless communication, a short-range communication, and so on.

The display 206 may be configured to enable the authorized person/owner of the physical store to interact with the detection and tracking device 102. The display 206 may also be configured to provide outputs received from the controller 208 to the authorized person/owner of the physical store. Example of the outputs may be, but are not limited to, the detected objects in the physical store, the tracking ID of the detected objects, and so on.

The controller 208 may be at least one of, but is not limited to, a single processer, a plurality of processors, multiple homogenous cores, multiple heterogeneous cores, multiple Central Processing Units (CPUs) of different kinds, and so on. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The controller 208 may be configured to detect and track the objects in the physical store, by processing the media received from the media acquisition devices 104a-104n deployed to cover the various points of the physical store.

Figure 3:
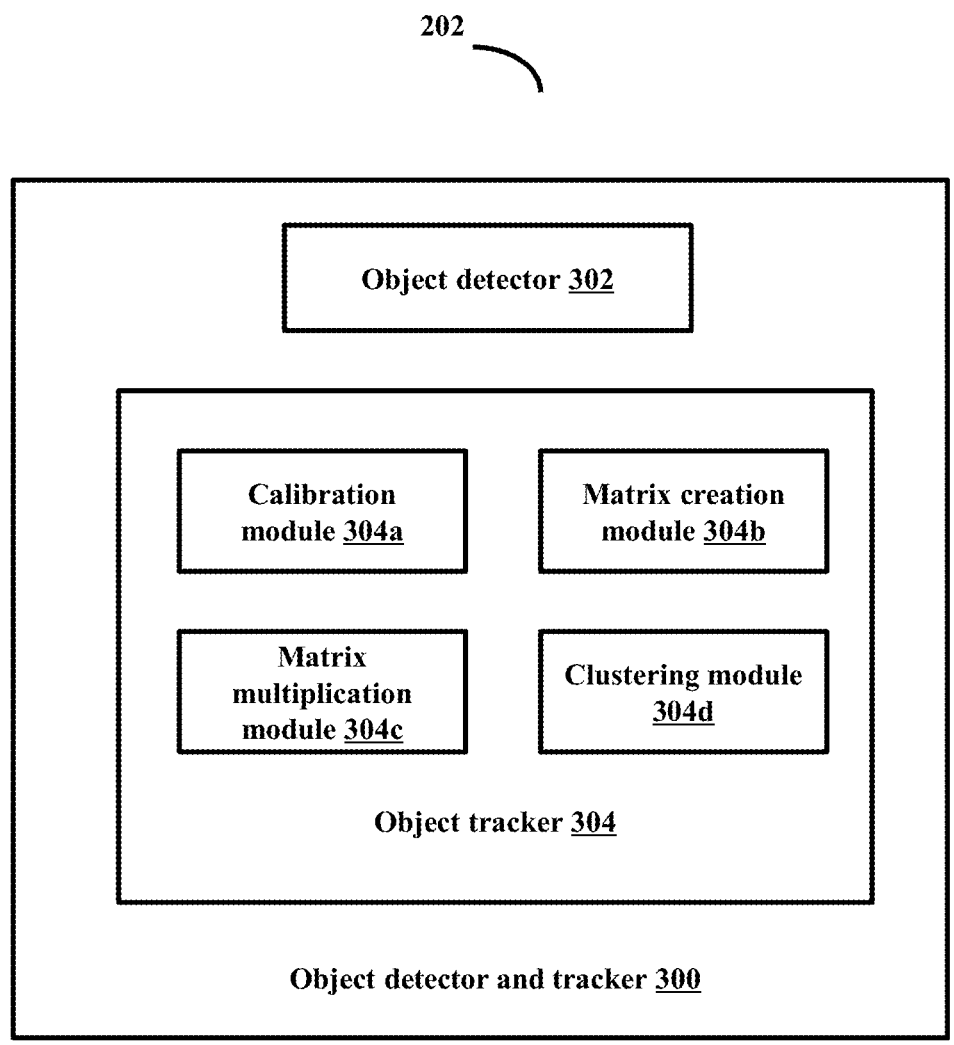
FIG. 3 depicts an object detection and tracker performable in the detection and tracking device to detect and track the objects within the physical store, according to embodiments as disclosed herein.

The controller 208 may execute/process the object detection and tracker 300 to detect and track the objects in the physical store. As depicted in FIG. 3, the object detection and tracker 300 includes an object detector 302, and an object tracker 304.

The object detector 302 may be configured to detect the at least one object in the media received from each of the media acquisition devices 104a-104n deployed in the various points of the physical store. The object detector 302 processes the received media using the custom training methods such as, a YOLO v4 training method, a computer vision (CV) method, and so on, and detects the at least one object in the media.

The object tracker 304 may be configured to track the detected at least one object in the physical store. The object tracker 304 includes a calibration module 304a, a matrix creation module 304b, a matrix multiplication module 304c, and a clustering module 304d for tracking the detected at least one object in the physical store.

The calibration module 304a may be configured to map/project the input data points of each media acquisition device (104a-104n) onto the groundplot. The calibration module 304a receives the media of the media acquisition device (for example: 104a) captured at the first point of the plurality of points for the pre-defined time period. The calibration module 304a detects the input data points of the media acquisition device 104a for the first point of the physical store. The calibration module 304a detects the first and second bounding boxes of the at least one object from the media of the media acquisition device 104a captured at the first point of the physical store and creates the average bounding box by averaging the coordinates of the first and second bounding boxes. The calibration module 304a detects the pixels coordinates of the average bounding box as the input points of the media acquisition device 104a, which depicts the at least one object present at the first point. The calibration module 304a projects the input data points of the media acquisition device 104a on the groundplot.

Similarly, the calibration module 304a receives the media from the other media acquisition devices (for example, 104b-104n) captured at the respective coverage points of the physical store, detects the input data points of each other media acquisition device 104b-104n for each respective coverage point, and projects the detected input data points of each other media acquisition device 104b-104n onto the groundplot. The input data points of the other media acquisition devices 104b-104n detected at the respective coverage points may or may not depict the at least one object present at the first point. The data points on the groundplot corresponding to the input data points of each media acquisition device may be the target data points for the corresponding media acquisition device.

The calibration module 304a provides information about the projection of the input data points of each media acquisition device (104a-104n) onto the groundplot to the matrix creation module 304b.

The matrix creation module 304b may be configured to create the projection matrix for each media acquisition device (104a-104n). The projection matrix created for the media acquisition device (104a-104n) acts a bridge between the input data points derived for the media acquisition device at the particular points of the physical store and the target data points of the respective media acquisition device mapped on the groundplot. The matrix creation module 304b creates the projection matrix for each media acquisition device (104a-104n) based on the input matrix, and the output matrix of the respective media acquisition device (104a-104n), and the transpose matrix. The input matrix of the media acquisition device (104a-104n) includes the input data points of the media acquisition device (104a-104n). The output matrix of the media acquisition device (104a-104n) includes the target data points of the media acquisition device (104a-104n). The transpose matrix is transpose of the input matrix of the media acquisition device (104a-104n). The matrix creation module 304b provides the created projection matrix for each media acquisition device (104a-104n) to the matrix multiplication module 304c.

The matrix multiplication module 304c performs the matrix multiplication to obtain the output data points for each media acquisition device (104a-104n) and visualizes/projects the continuous stream of the output data points of each media acquisition device (104a-104n) 17 on the groundplot. The visualization of the continuous stream of the output data points of each media acquisition device (104a-104n) on the groundplot may depict the data points of the same object strongly associated to each other on the groundplot. The matrix multiplication module 304c provides information about the visualization to the clustering module 304d.

The clustering module 304d may be configured to form the cluster of data points by grouping the data points of the same object on the groundplot that have been strongly associated with each other. The clustering module 304d processes the visualization of the continuous stream of the input data points of each object on the groundplot using the K-means clustering method of the neural network and forms the cluster of data points for each object.

The neural network may comprise a plurality of layers. Each layer has a plurality of weight values and performs a layer operation through calculation of a previous layer and an operation of a plurality of weights/coefficients. Examples of the neural networks include at least one of, but is not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression based neural network, a deep reinforcement model, a deep Q-network, and so on. The neural network may include a plurality of nodes, which may be arranged in the layers. Examples of the layers may be, but are not limited to, a convolutional layer, an activation layer, an average pool layer, a max pool layer, a concatenated layer, a dropout layer, a fully connected layer, a SoftMax layer, and so on.

The neural network may be trained using at least one learning method to form the cluster of data points for each object. Examples of the learning method may be, but are not limited to, supervised learning, unsupervised learning, semi-supervised learning, reinforcement learning, regression-based learning, and so on. A function associated with the learning method may be performed through the non-volatile memory, the volatile memory, and the controller 208. The controller 208 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or a plurality of processors form the cluster of data points for each object, in accordance with pre-defined operating rules of the neural network stored in the non-volatile memory and the volatile memory. The predefined operating rules of the neural network are provided through training the neural network using the learning method.

Here, being provided through learning means that, by applying the learning method to a plurality of learning data, a predefined operating rule or AI model of a desired characteristic is made. Forming the cluster of data points for each object may be performed in the detection and tracking device 102 itself in which the learning according to an embodiment is performed, and/or may be implemented through a separate server/system.

On forming the cluster of data points for each object, the clustering module 304d identifies the centroid of the cluster and assigns the tracking ID to the cluster. The centroid of the cluster may correspond to the object. The clustering module 304d assigns the tracking ID to the cluster, when the data points of the object on the groundplot appear near the vicinity of the entry point of the physical store.

FIGS. 2 and 3 show exemplary blocks of the detection and tracking device 102, but it is to be understood that other embodiments are not limited thereon. In other embodiments, the detection and tracking device 102 may include less or more number of blocks. Further, the labels or names of the blocks are used only for illustrative purpose and does not limit the scope of the embodiments herein. One or more blocks can be combined together to perform same or substantially similar function in the detection and tracking device 102.

Figure 4:
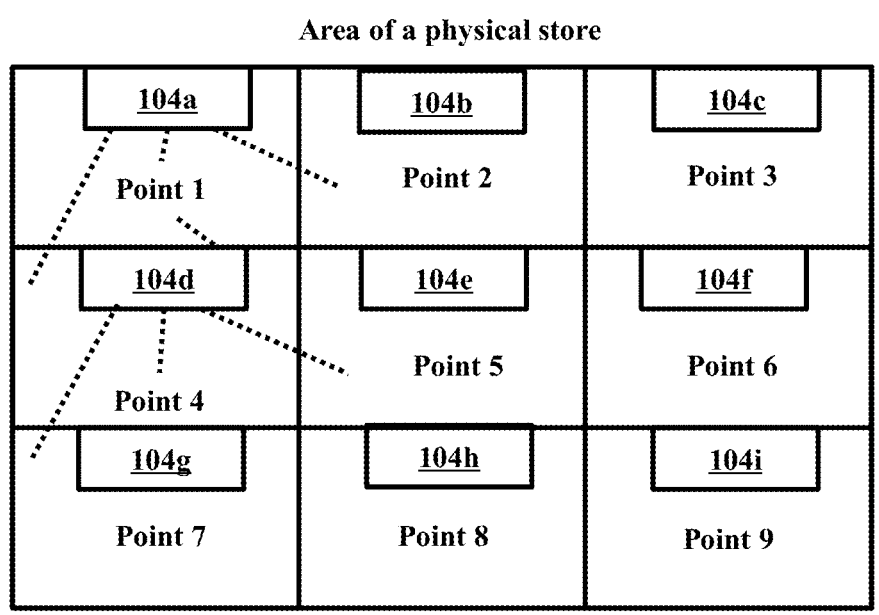
FIG. 4 is an example diagram depicting deployment of media acquisition devices in the physical store, according to embodiments as disclosed herein.

FIG. 4 is an example diagram depicts deployment of the media acquisition devices 104a-104n in the physical store, according to embodiments as disclosed herein.

The detection and tracking device 102 divides the entire area of the physical store into the plurality of points for example: points 1-9. The detection and tracking device 102 allows the owner of the physical store to deploy the media acquisition devices/camera 104a-104i in the physical store to cover the at least three points among the 9 points of the physical store. The media acquisition devices 104a-104i may be deployed in the physical store by hinging the media acquisition devices 104a-104i on the ceiling of the physical store to cover the at least three points of the points 1-9. The media acquisition devices 104a-104i may be positioned next to each other with the overlap between the adjacent media acquisition devices 104a-104i. In an example, as depicted in FIG. 4, the media acquisition device 104a covers the points 1, 2 and 4, and the media acquisition device 104d covers the points 1, 4, 7, and 5.

Figure 5:
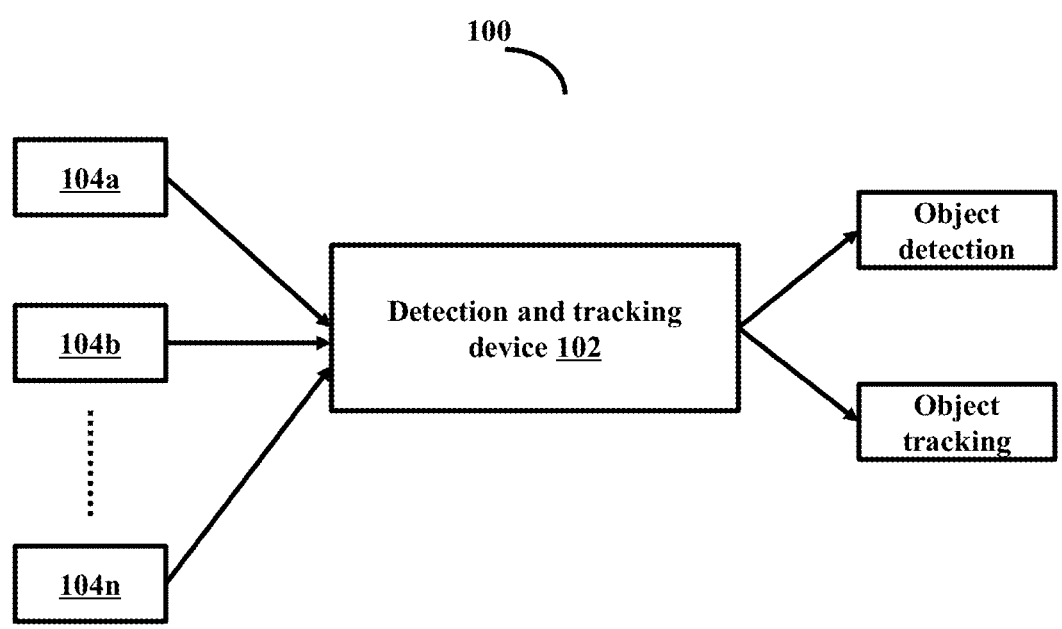
FIG. 5 is an example conceptual diagram depicting detection and tracking of the at least one object in the physical store, according to embodiments as disclosed herein.

FIG. 5 is an example conceptual diagram depicting detection and tracking of the at least one object in the physical store, according to embodiments as disclosed herein.

The detection and tracking device 102 receives the media from the plurality of media acquisition devices 104a-104n and detects the at least one object in the media received from each media acquisition device (104a-104n). The detection and tracking device 102 detects the at least one object in the media using the custom training methods such as, a computer vision method, a YOLO v4 training method, and so on.

The detection and tracking device 102 also tracks the detected at least one object by assigning the tracking ID to the at least one object.

Figure 6:
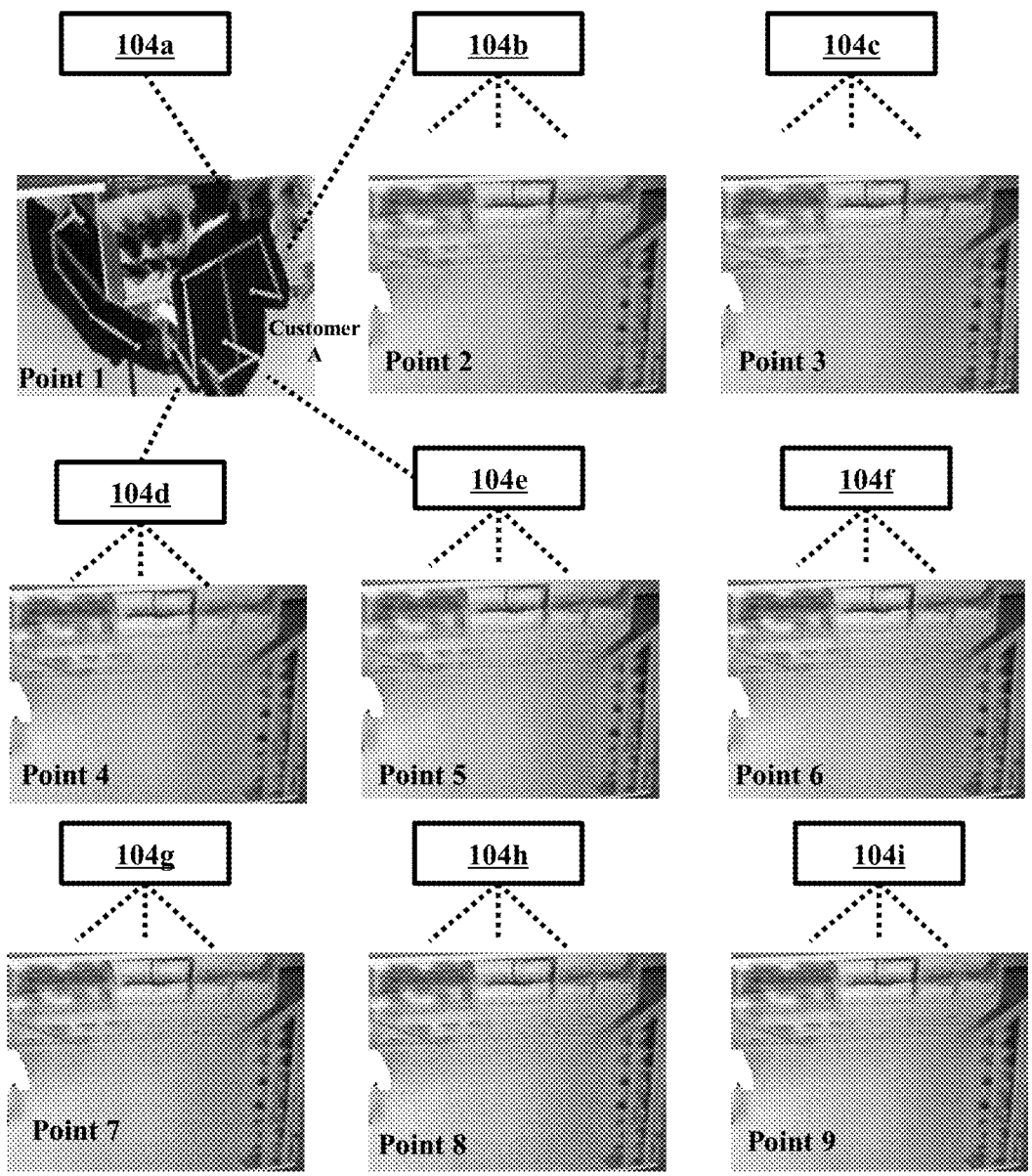
FIG. 6 is an example diagram depicting derivation of input data points of each media acquisition device capturing different points of the physical store, according to embodiments as disclosed herein.

Consider an example scenario, as depicted in FIG. 6, wherein the physical store is divided into 9 points and the media acquisition devices 104a-104i are deployed in the physical store to cover the at least three points among the 9 points of the physical store. In such a scenario for tracking the at least one object, the detection and tracking device 102 collects the media of a point 1 from the media acquisition device 104a for 10 seconds (for example), wherein a customer A may be detected at the point 1. The detection and tracking device 102 detects the input data points of the media acquisition device 104a for the point 1. The input data points depict the pixel coordinates of the customer A present at the point 1. The detection and tracking device 102 collects the media from the media acquisition devices 104b-104i capturing the respective coverage points. For example, the detection and tracking device 102 collects the media from the media acquisition device 104d which captures the points 1, 4, 5, and 7. The detection and tracking device 102 detects the input data points of the media acquisition devices 104b-104i with respect to their coverage points. The input data points of the media acquisition devices 104b-104n depict the at least one object present at their respective coverage points.

Figure 7:
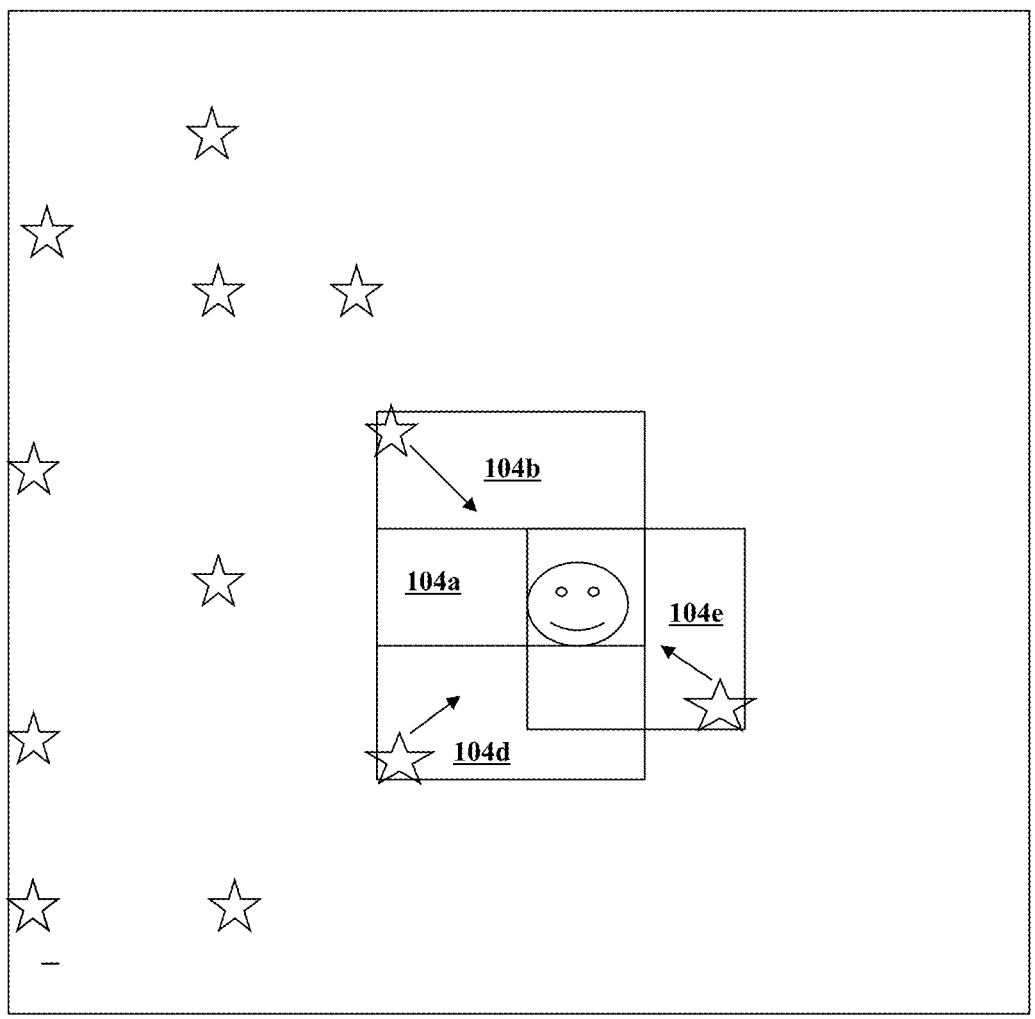
FIG. 7 is an example diagram depicting projection of the input data points of each media acquisition device on a groundplot, according to embodiments as disclosed herein.

The detection and tracking device 102 projects the input data points of the media acquisition devices 104a-104n with respect to their coverage points on the groundplot, as depicted in FIG. 7. As depicted in FIG. 7, the input data points of the media acquisition devices 104a, 104b, 104d, and 104e depict the same customer A, as the media acquisition devices 104a, 104b, 104d, and 104e may have the point 1 in its field of view/coverage.

The detection and tracking device 102 creates the projection matrix for each of the media acquisition devices 104a-104n based on the input data points of the respective media acquisition device, the target data points on the groundplot corresponding to the input data points of the respective media acquisition device, and the transpose of the input data points of the respective media acquisition device.

The detection and tracking device 102 generates the output data points for each of the media acquisition devices 104a-104n by performing the multiplication of the input data points of the respective media acquisition device with the projection matrix. The detection and tracking device 102 visualizes the output data points of each of the media acquisition devices 104a-104n on the ground plot, as depicted in FIG. 8. A groundplot visualization, as depicted in FIG. 8, depicts the data points of the customer A, that have been strongly associated with each other.

Figure 9:
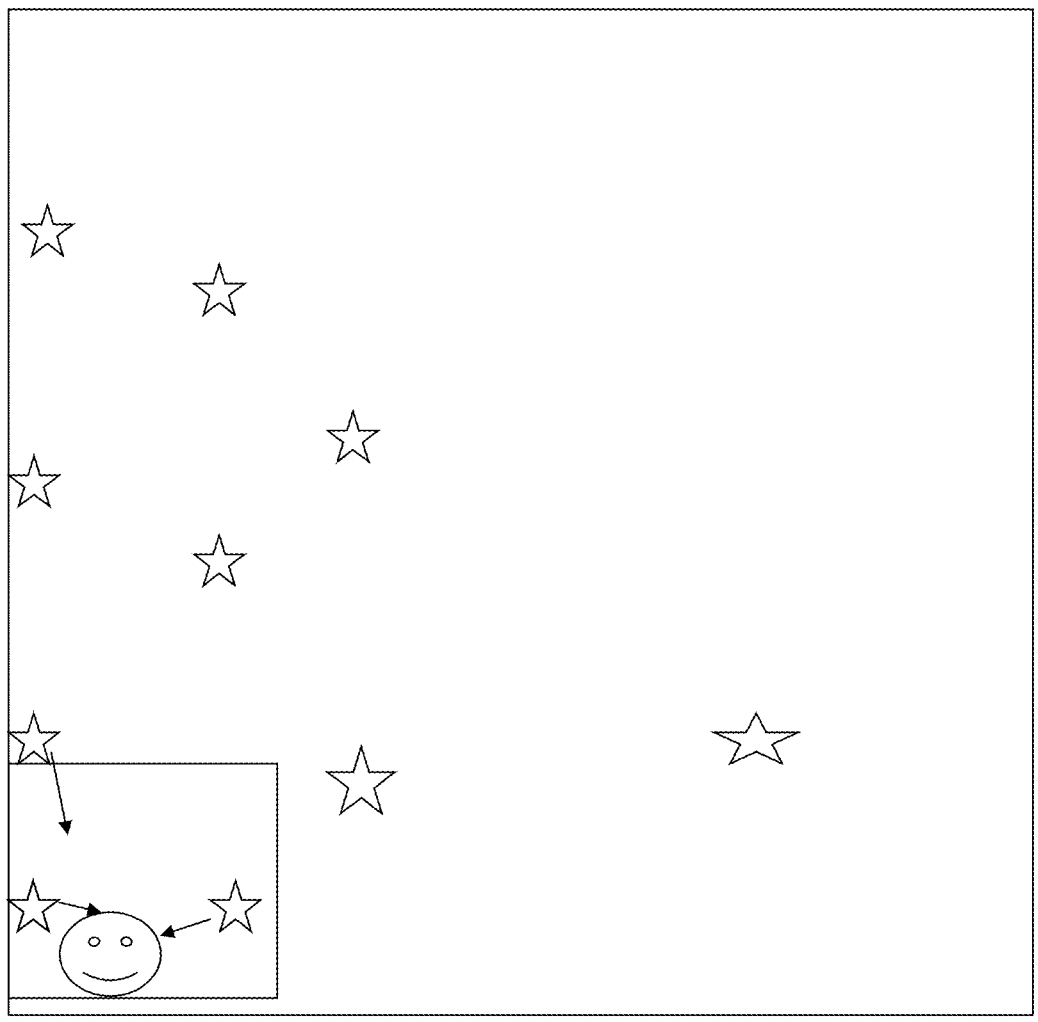
FIG. 9 is an example diagram depicting assigning of a tracking identifier (ID) to the at least one object, according to embodiments as disclosed herein.

On visualizing the output data points of each of the media acquisition devices 104a-104n on the ground plot, the detection and tracking device 102 forms the cluster of the data points of the customer A and identifies the centroid of the cluster. The detection and tracking device 102 assigns the tracking ID to the centroid of the cluster, which depicts the at least one object. The detection and tracking device 102 assigns the tracking ID to the centroid of the cluster/at least one object, when the data points of the customer A appear near to the entry point of the physical store, as depicted in FIG. 9.

The detection and tracking device 102 may use the tracking ID of the customer A for tracking the customer A in the physical store, determine the products picked up the customer A and auto-generate the bill for the customer A.

Figure 10:
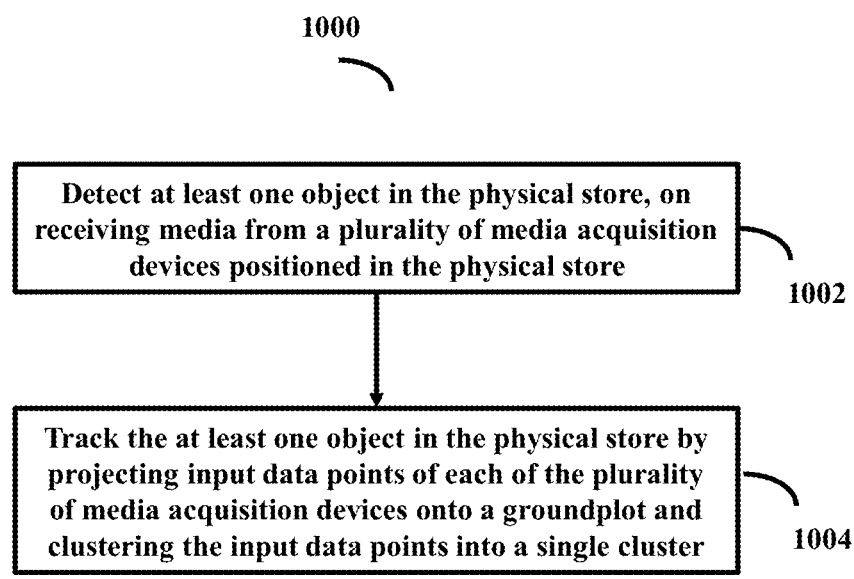
FIG. 10 is a flow diagram depicting a method for detecting and tracking the objects in the physical store, according to embodiments as disclosed herein.

FIG. 10 is a flow diagram 1000 depicting a method for detecting and tracking the objects in the physical store, according to embodiments as disclosed herein.

At step 1002, the method includes detecting, by the detection and tracking device 102, the at least one object in the physical store, on receiving the media from the plurality of media acquisition devices 104a-104n positioned in the physical store. The plurality of media acquisition devices 104a-104n may be hinged on the ceiling of the physical store at the defined angle to cover the at least one point of the plurality of points of the physical store, wherein the at least one point depicts the portion of the entire area of the physical store.

Figure 11:
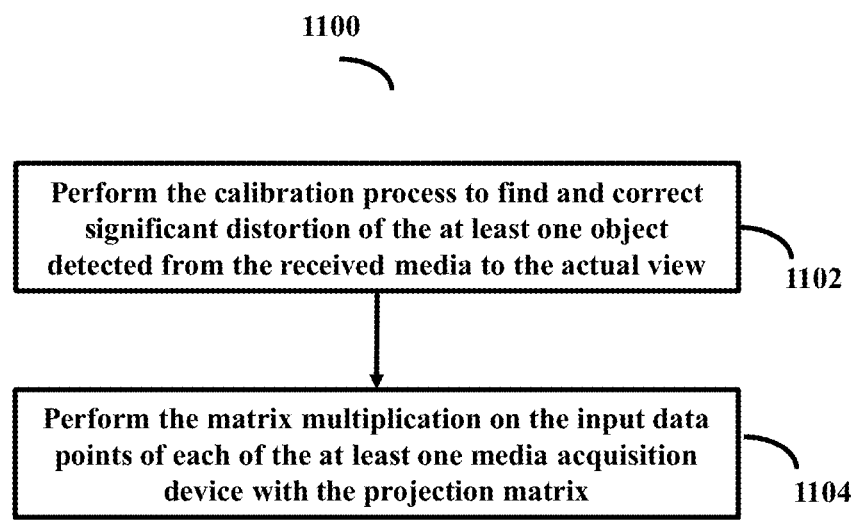
FIG. 11 is an example diagram depicting a method for projecting the input data points of the media acquisition devices onto the groundplot, according to embodiments as disclosed herein.

At step 1004, the method includes tracking, by the detection and tracking device 102, the at least one object in the physical store by projecting the input data points of each media acquisition device (104a-104n) onto the groundplot and clustering the input data points into the single cluster. The various actions in method 1000 may be performed in the order presented, in a different order or simultaneously. Further, in some embodiments, some actions listed in FIG. 10 may be omitted FIG. 11 is an example diagram 1100 depicting a method for projecting the input data points of each media acquisition device onto the groundplot, according to embodiments as disclosed herein.

At step 1102, the method includes performing, by the detection and tracking device 102, the calibration process to find and correct significant distortion of the at least one object detected from the received media to the actual view.

At step 1104, the method includes performing, by the detection and tracking device 102, the matrix multiplication on the input data points of each of the media acquisition device (104a-104n) with the associated projection matrix. The various actions in method 1100 may be performed in the order presented, in a different order or simultaneously. Further, in some embodiments, some actions listed in FIG. 11 may be omitted.

Figure 12:
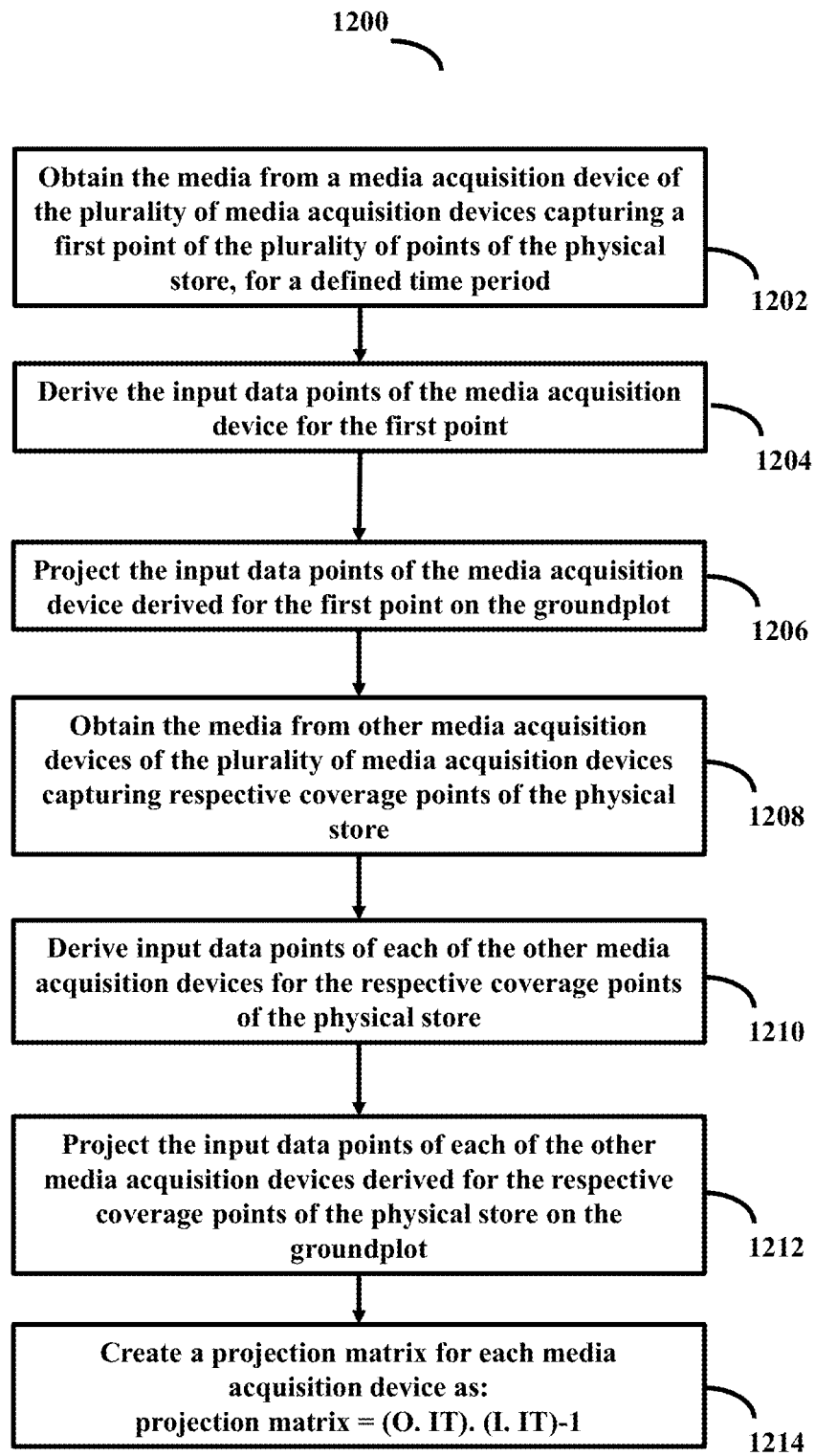
FIG. 12 is a flow diagram depicting a method for performing a calibration process, according to embodiments as disclosed herein.

FIG. 12 is a flow diagram 1200 depicting a method for performing the calibration process, according to embodiments as disclosed herein.

At step 1202, the method includes obtaining, by the detection and tracking device 102, the media from the media acquisition device 104a of the plurality of media acquisition devices (104a-104n) capturing the first point of the plurality of points of the physical store. The first point may be the point of the physical store where the at least one object is detected.

At step 1204, the method includes deriving, by the detection and tracking device 102, the input data points of the media acquisition device 104a for the first point. At step 1206, the method includes projecting, by the detection and tracking device 102, the input data points of the media acquisition device 104a derived for the first point on the groundplot.

At step 1208, the method includes obtaining, by the detection and tracking device 102, the media from the other media acquisition devices 104b-104n capturing respective coverage points of the physical store. At step 1210, the method includes deriving, by the detection and tracking device 102, the input data points of each of the other media acquisition devices for the respective coverage points of the physical store. The input data points of the other media acquisition devices for the respective coverage points depicts the at least one same object detected at the first point or at least one different object.

At step 1212, the method includes projecting, by the detection and tracking device 102, the input data points of each of the other media acquisition devices derived for the respective coverage points of the physical store on the groundplot. At step 1214, the method includes creating, by the detection and tracking device 102, the projection matrix for each of the media acquisition devices (104a-104n) as:

$$\text{projection matrix} = (O \cdot IT) \cdot INV(I \cdot IT)$$

wherein 'I' is an input matrix depicting the input data points of the respective media acquisition device, 'O' is an output matrix depicting target data points on the groundplot corresponding to the input data points of the respective media acquisition device, and 'IT' is a transpose of the input matrix. The projection matrix created for each object acts a bridge between the input data points of the respective media acquisition device and the associated target data points mapped on the groundplot. The various actions in method 1200 may be performed in the order presented, in a different order or simultaneously. Further, in some embodiments, some actions listed in FIG. 12 may be omitted.

Figure 13:
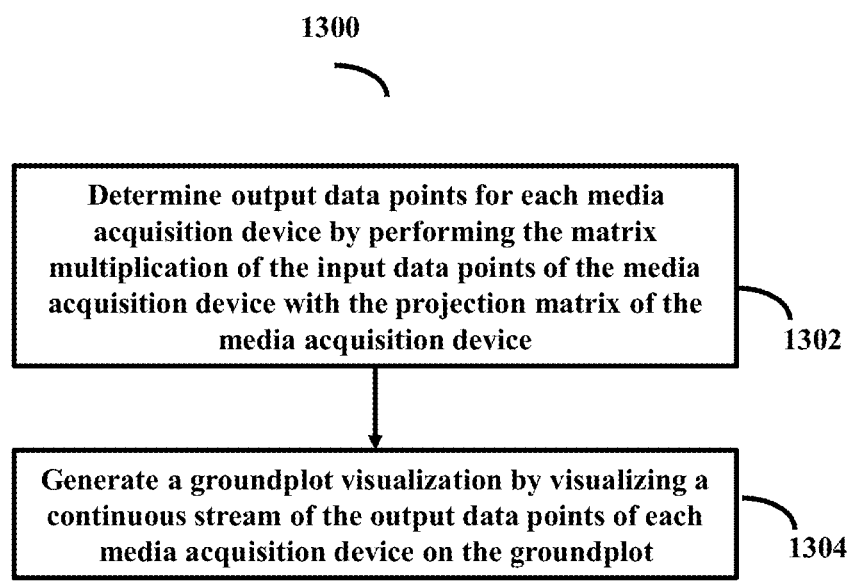
FIG. 13 is a flow diagram depicting a method for performing a matrix multiplication, according to embodiments as disclosed herein.

FIG. 13 is a flow diagram 1300 depicting a method for performing the matrix multiplication, according to embodiments as disclosed herein.

At step 1302, the method includes determining, by the detection and tracking device 102, the matrix multiplication of the input data points of the media acquisition device with the projection matrix of the media acquisition device.

At step 1304, the method includes generating, by the detection and tracking device 102, a groundplot visualization (as depicted in FIG. 8) by visualizing the continuous stream of the output data points of each media acquisition device on the groundplot. The groundplot visualization indicates the data points of the at least one object on the groundplot that have been strongly connected with each other. The various actions in method 1300 may be performed in the order presented, in a different order or simultaneously. Further, in some embodiments, some actions listed in FIG. 13 may be omitted.

Figure 14:
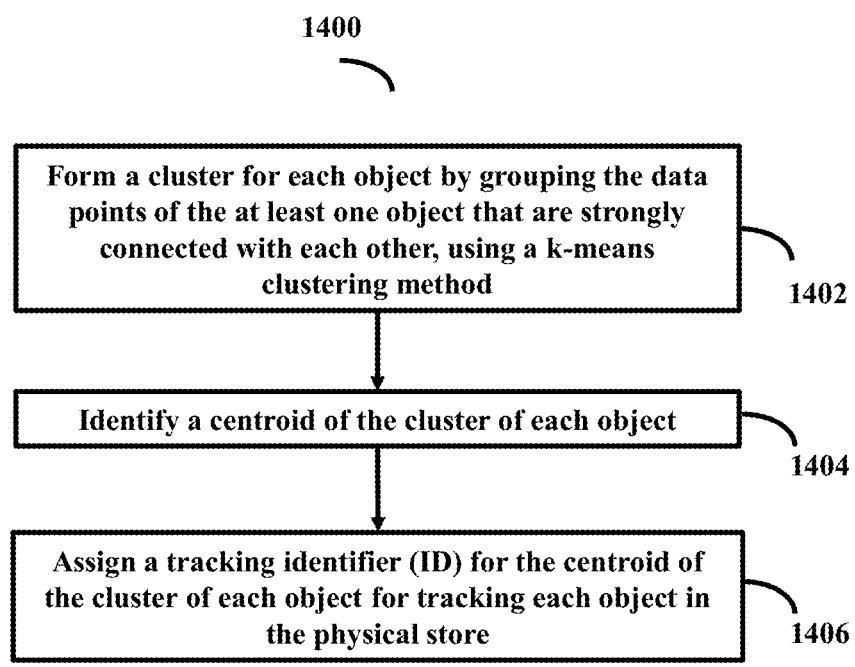
FIG. 14 is a flow diagram depicting a method for performing a clustering to assign the tracking ID for each object, according to embodiments as disclosed herein.

FIG. 14 is a flow diagram 1400 depicting a method for performing the clustering to assign the tracking ID for each object, according to embodiments as disclosed herein.

At step 1402, the method includes forming, by the detection and tracking device 102, the cluster for each of the at least one object by grouping the data points of the same object that are strongly connected with each other.

At step 1404, the method includes identifying, by the detection and tracking device 102, the centroid of the cluster of each object. At step 1406, the method includes assigning, by the detection and tracking device 102, the tracking ID for the centroid of the cluster of each object for tracking each object in the physical store, wherein the centroid of the cluster corresponds to the associated object. The various actions in method 1400 may be performed in the order presented, in a different order or simultaneously. Further, in some embodiments, some actions listed in FIG. 14 may be omitted.

Embodiments herein disclose a tracking system to detect at least one object in a physical store, on receiving media from a plurality of media acquisition devices positioned in the physical store and track the at least one object in the physical store by projecting input data points associated with each media acquisition device onto a groundplot and clustering the input data points into a single cluster. Thus, the tracking system disclosed herein may be cost efficient, power efficient, more flexible, and more scalable and manageable.

The embodiments disclosed herein may be implemented through at least one software program running on at least one hardware device and performing network management functions to control the elements. The elements shown in FIGS. 1*a*-3, may be at least one of a hardware device, or a combination of hardware device and software module.

The embodiments disclosed herein describe methods and systems for detecting and tracking objects. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit Hardware Description Language (VHDL) another programming language, or implemented by one or more VHDL or several software modules being executed on at least one hardware device. The hardware device may be any kind of portable device that may be programmed The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein may be practiced with modification within the spirit and scope of the embodiments as described herein.

What is claimed is:

1. A method for detecting and tracking objects in a physical store, the method comprising:
 detecting, by a detection and tracking device, at least one object in a physical store on receiving media from a plurality of media acquisition devices positioned in the physical store, each media acquisition device covering at least three points of a plurality of points of the physical store, wherein a point depicts a portion of an entire area of the physical store, with adjacent media acquisition devices overlapping each other by at least one point; and
 tracking, by the detection and tracking device, the at least one object in the physical store by projecting input data points of each of the plurality of media acquisition devices onto a groundplot by applying a calibration process and a matrix multiplication process, and clustering the input data points into a single cluster, wherein clustering of the input data points comprises:
 generating a groundplot visualization by visualizing a continuous stream of output data points of each media acquisition device on the groundplot, wherein the groundplot visualization indicates data points of each object on the groundplot that are strongly connected with each other;
 forming a cluster for each object by grouping the data points of each object that are strongly connected with each other using a k-means clustering method;
 identifying a centroid of the cluster of each object; and
 assigning a tracking identifier (ID) for the centroid of the cluster of each object for tracking each object in the physical store, wherein the centroid of the cluster corresponds to the associated object.

2. The method of claim 1, wherein performing the calibration process includes:
 obtaining the media from a media acquisition device of the plurality of media acquisition devices capturing a first point of the plurality of points of the physical store, for a defined time period, wherein the first point is the point of the physical store where the at least one object is detected;
 deriving the input data points of the media acquisition device for the first point;
 projecting the input data points of the media acquisition device derived for the first point onto the groundplot;
 obtaining the media from other media acquisition devices of the plurality of media acquisition devices capturing respective coverage points of the physical store;
 deriving input data points of each of the other media acquisition devices for the respective coverage points of the physical store, wherein the input data points of the other media acquisition devices for the respective coverage points depicts the at least one same object detected at the first point or at least one different object;
 projecting the input data points of each of the other media acquisition devices derived for the respective coverage points of the physical store onto the groundplot; and
 creating a projection matrix for each of the media acquisition devices as:

projection matrix=$(O \cdot IT) \cdot INV(I \cdot IT)$ wherein 'I' is an input matrix depicting the input data points of the respective media acquisition device, 'O' is an output matrix depicting target data points on the groundplot corresponding to input data points of the respective media acquisition device, and 'IT' is a transpose of the input matrix, wherein the projection matrix created for each media acquisition device acts a bridge between the input data points of the respective media acquisition device and the associated target data points mapped on the groundplot.

3. The method of claim 2, wherein deriving the input data points of each of the plurality of media acquisition device includes:

identifying a first bounding box and a second bounding box from the received media of the media acquisition device, wherein the at least one object is enclosed in the first bounding box and the second bounding box;

creating an average bounding box by averaging coordinates of the first bounding box and the second bounding box; and deriving pixel coordinates of the average bounding box as the input data points of the media acquisition device, wherein the input data points of the media acquisition device depict the pixel coordinates of the at least one object detected from the media of the respective media acquisition device.

4. The method of claim 2, wherein performing the matrix multiplication includes:

determining output data points for each media acquisition device by performing the matrix multiplication of the input data points of each media acquisition device with the respective projection matrix.

5. The method of claim 1, wherein the tracking ID to the at least one object is assigned on detecting the data points of the at least one object as it appears near an entry point of the physical store.

6. A detecting and tracking device comprising:

a memory; and a controller coupled to the memory adapted to:

detect at least one object in a physical store on receiving media from a plurality of media acquisition devices positioned in the physical store, wherein each media acquisition device covers at least three points of a plurality of points defining an area of the physical store, and wherein adjacent media acquisition devices overlap each other by at least one point; and track the at least one object in the physical store by projecting input data points of each of the plurality of media acquisition devices onto a groundplot by applying a calibration process and a matrix multiplication process, and clustering the input data points into a single cluster, wherein clustering of the input data points comprises:

generating a groundplot visualization by visualizing a continuous stream of output data points of each media acquisition device on the groundplot, wherein the groundplot visualization indicates data points of the at least one object on the groundplot that are strongly connected with each other;

forming a cluster for each object by grouping the respective data points of each object that are strongly connected with each other using a k-means clustering method;

identifying a centroid of the cluster of each object; and assigning a tracking identifier (ID) for the centroid of the cluster of each object for tracking each object in the physical store, wherein the centroid of the cluster corresponds to the associated object.

7. The detecting and tracking device of claim 6, wherein the controller is adapted to:

obtain the media from a media acquisition device of the plurality of media acquisition devices capturing a first point of the plurality of points of the physical store, for a defined time period, wherein the first point is the point of the physical store where the at least one object is detected;

derive the input data points of the media acquisition device for the first point;

project the input data points of the media acquisition device derived for the first point on the groundplot;

obtain the media from other media acquisition devices of the plurality of media acquisition devices capturing respective coverage points of the physical store;

derive input data points of each of the other media acquisition devices for the respective coverage points of the physical store;

project the input data points of each of the other media acquisition devices derived for the respective coverage points of the physical store onto the groundplot; and create a projection matrix for each of the media acquisition devices as:

projection matrix=$(O \cdot IT) \cdot INV(I \cdot IT)$ wherein 'I' is an input matrix depicting the input data points of the respective media acquisition device, 'O' is an output matrix depicting target data points on the groundplot corresponding to input data points of the respective media acquisition device, and 'IT' is a transpose of the input matrix, wherein the projection matrix created for each media acquisition device acts a bridge between the input data points of the respective media acquisition device and the associated target data points mapped on the groundplot.

8. The detecting and tracking device of claim 7, wherein the controller is adapted to:

identify a first bounding box and a second bounding box from the received media of the media acquisition device, wherein the at least one object is enclosed in the first bounding box and the second bounding box;

create an average bounding box by averaging coordinates of the first bounding box and the second bounding box; and derive pixel coordinates of the average bounding box as the input data points of the media acquisition device, wherein the input data points of the media acquisition device depict the pixel coordinates of the at least one object detected from the media of the respective media acquisition device.

9. The detecting and tracking device of claim 7, wherein the controller is adapted to:

determine output data points for each media acquisition device by performing the matrix multiplication of the input data points of each media acquisition device with the respective projection matrix.

10. The detecting and tracking device of claim 6, wherein the tracking ID to the at least one object is assigned on detecting the data points of the at least one object as it appears near an entry point of the physical store.

11. A tracking system comprising:

a plurality of media acquisition devices, each media acquisition device covering at least three points of a plurality of points defining an area of a physical store, with adjacent media acquisition devices overlapping each other by at least one point, wherein each media acquisition device is adapted to:

capture media of at least one point of the physical store, wherein the at least one point includes at least one object; and a detection and tracking device coupled to the plurality of media acquisition devices adapted to:

detect the at least one object in the physical store on receiving media from the plurality of media acquisition devices; and track the at least one object in the physical store by projecting input data points of each of the plurality of media acquisition devices onto a groundplot by applying a calibration process and a matrix multiplication process, and clustering the input data points into a single cluster, wherein clustering of the input data points comprises:

generating a groundplot visualization by visualizing a continuous stream of output data points of each media acquisition device on the groundplot, wherein the groundplot visualization indicates data points of the at least one object on the groundplot that are strongly connected;

forming a cluster for each object by grouping the data points of the object that are strongly connected with each other using a k-means clustering method;

identifying a centroid of the cluster for each object; and assigning a tracking identifier (ID) for the centroid of the cluster of each object for tracking each object in the physical store, wherein the centroid of the cluster corresponds to the associated object.

12. The tracking system of claim 11, the detection and tracking device further adapted to:

obtain the media from a media acquisition device of the plurality of media acquisition devices capturing a first point of the plurality of points of the physical store, for a defined time period, wherein the first point is the point of the physical store where the at least one object is detected;

derive the input data points of the media acquisition device for the first point;

project the input data points of the media acquisition device derived for the first point onto the groundplot;

obtain the media from other media acquisition devices of the plurality of media acquisition devices capturing respective coverage points of the physical store;

derive input data points of each of the other media acquisition devices for the respective coverage points of the physical store;

project the input data points of each of the other media acquisition devices derived for the respective coverage points of the physical store on the groundplot;

create a projection matrix for each of the media acquisition devices based on the input data points of the respective media acquisition device, target data points on the groundplot corresponding to input data points of the respective media acquisition device, and a transpose of the input matrix, wherein the projection matrix created for each media acquisition device acts a bridge between the input data points of the respective media acquisition device and the associated target data points mapped on the groundplot; and determine output data points for each media acquisition device by performing the matrix multiplication of the input data points of the media acquisition device with the respective projection matrix of the media acquisition device.

* * * * *

UNITED STATES PATENT AND TRADEMARK OFFICE
CERTIFICATE OF CORRECTION

| | |
|---|---|
| PATENT NO. | : 12,002,336 B2 |
| APPLICATION NO. | : 17/303937 |
| DATED | : June 4, 2024 |
| INVENTOR(S) | : Chithrai Selvakumar Mani and Venkat Shiva Pandiri |

It is certified that error appears in the above-identified patent and that said Letters Patent is hereby corrected as shown below:

In the Drawings

Sheet 14, FIG. 12, and on the title page, the illustrative print figure, box reference 1214: the equation "projection matrix = (O.IT).(I.IT)-1" should read, --projection matrix = (O.IT).INV(I.IT)--.

In the Specification

Column 5, Lines 54 to 56: the sentence should read, "The actual view depicts how the at least one object should look on the ground plot.".

Column 6, Line 52: the line should read, "(104a-104n) acts as a bridge between the input data points of".

Column 6, Line 66; Column 16, Line 28; Column 18, Line 59; and Column 20, Line 18: each occurrence of "'IT'" should read, --'IT'--.

Column 12, Line 40: the numerical text "17" should be deleted.

Signed and Sealed this
First Day of October, 2024

Katherine Kelly Vidal
*Director of the United States Patent and Trademark Office*